United States Patent [19]
Rockwood

[11] Patent Number: 5,632,608
[45] Date of Patent: May 27, 1997

[54] PUMP OIL MISTER WITH REDUCED WINDAGE

[75] Inventor: Robert E. Rockwood, Windham, N.H.

[73] Assignee: Environamics Corporation, Hudson, N.H.

[21] Appl. No.: 635,398

[22] Filed: Apr. 26, 1996

Related U.S. Application Data

[63] Continuation of Ser. No. 320,692, Oct. 11, 1994, Pat. No. 5,513,964.

[51] Int. Cl.$^6$ ...................................................... F04B 35/04
[52] U.S. Cl. ............................. 417/423.13; 415/175
[58] Field of Search ................... 417/423.12, 423.13; 415/109, 175; 184/11.1, 11.2, 626, 55.1

[56] References Cited

U.S. PATENT DOCUMENTS

| | | |
|---|---|---|
| 2,373,609 | 4/1945 | Stahl. |
| 2,382,960 | 8/1945 | Compton et al.. |
| 2,386,505 | 10/1945 | Puchy. |
| 2,485,537 | 10/1949 | Rae, Jr.. |
| 2,587,077 | 2/1952 | Winther. |
| 2,632,281 | 3/1953 | Schmidt, Jr.. |
| 2,903,970 | 9/1959 | Elovitz et al.. |
| 2,950,943 | 8/1960 | Forrest. |
| 2,984,505 | 5/1961 | Andresen et al.. |
| 3,027,165 | 3/1962 | Kempff et al.. |
| 3,083,972 | 4/1963 | Huddle. |
| 3,091,469 | 5/1963 | Matt. |
| 3,112,708 | 12/1963 | Kaufmann. |
| 3,115,097 | 12/1963 | Zagar et al.. |
| 3,122,375 | 2/1964 | Greenwald. |
| 3,195,035 | 7/1965 | Sudmeier. |
| 3,457,871 | 7/1969 | Herger. |
| 3,515,497 | 6/1970 | Studebaker et al.. |
| 3,624,763 | 11/1971 | Rohr. |
| 3,655,295 | 4/1972 | Mitchell. |
| 3,763,961 | 10/1973 | Casale. |
| 3,923,416 | 12/1975 | Frey. |
| 4,402,515 | 9/1983 | Malott. |
| 4,429,883 | 2/1984 | Nakanishi. |
| 4,439,096 | 3/1984 | Rockwood et al.. |
| 4,521,151 | 6/1985 | Frater et al.. |
| 4,565,378 | 1/1986 | Wehrfritz et al.. |
| 4,613,141 | 9/1986 | Heinen. |
| 4,688,806 | 8/1987 | Heilala. |
| 4,813,689 | 3/1989 | Stalter et al.. |
| 4,840,385 | 6/1989 | Senft et al.. |
| 4,881,829 | 11/1989 | Koelsch. |
| 4,889,039 | 12/1989 | Miller. |
| 4,890,941 | 1/1990 | Calafell, II et al.. |
| 4,900,039 | 2/1990 | Klecker et al.. |

(List continued on next page.)

FOREIGN PATENT DOCUMENTS

| | | |
|---|---|---|
| 1040304 | 10/1953 | France. |
| 2822499 | 10/1977 | Germany. |
| 941683 | 5/1980 | U.S.S.R.. |

*Primary Examiner*—Charles G. Freay
*Attorney, Agent, or Firm*—Myers Liniak & Berenato

[57] ABSTRACT

A centrifugal environmentally safe pump including a motor driven pump shaft having a fluid pumping impeller affixed thereto. A plurality of annular shaft supporting bearing assemblies are disposed along the shaft adjacent a lubrication chamber, the lubrication chamber housing lubrication fluid (e.g. oil) maintained at a level below rotating portions of the bearing assemblies so as to maintain a low operating temperature within the chamber and adjacent the bearings. A lubricating fluid dispenser having a thin-profile, disc-shaped portion is affixed to the pump shaft within the lubrication chamber for rotation along with the shaft. The width or profile of the disc-shaped portion of the dispenser is small so as to reduce windage adjacent the lubricating fluid level when the shaft and dispenser are rotated at high speeds thereby allowing the level of the lubrication fluid to be maintained substantially constant and below the bearing balls, even when the pump is operated at high speeds. A plurality of wire-like fluid contacting members are loosely connected along the outer periphery of the disc-shaped portion, the wire members for dipping into the lubricating fluid when the pump shaft is rotating thereby dispersing or misting the fluid throughout the chamber.

2 Claims, 6 Drawing Sheets

U.S. PATENT DOCUMENTS

| | | |
|---|---|---|
| 4,915,579 | 4/1990 | Whittier et al. . |
| 5,011,166 | 4/1991 | Watts . |
| 5,158,304 | 10/1992 | Orlowski . |
| 5,174,583 | 12/1992 | Orlowski et al. . |
| 5,221,095 | 6/1993 | Orlowski . |
| 5,261,676 | 11/1993 | Rockwood . |
| 5,340,273 | 8/1994 | Rockwood . |
| 5,499,902 | 3/1996 | Rockwood ............................ 415/109 |
| 5,513,964 | 5/1996 | Rockwood . |

PUMP OIL MISTER WITH REDUCED WINDAGE

This is a continuation of application Ser. No. 08/320,692, filed Oct. 11, 1994, now U.S. Pat. No. 5,513,964 the disclosure of which is incorporated herein by reference.

This invention relates to a bearing lubrication system for a pump. More particularly, this invention relates to a bearing lubrication system disposed within a pump for lubricating bearings rotatably supporting the pump shaft.

BACKGROUND OF THE INVENTION

Environmentally hazardous fluids such as acids, oils, and toxins, which can cause serious harm to the environment often need to be pumped throughout fluid flow systems from one location to another. Centrifugal pumps generally including a motor driven impeller affixed to a pump shaft are typically utilized in pumping such fluids. The pump shafts of such pumps are typically rotatably supported against radial movement and vibration by conventional pump shaft bearings (e.g. ball bearings). These bearings must be continually lubricated throughout the operation of the pump in order to reduce maintenance requirements and maintain a satisfactory operating life of the bearings and thus the pump.

Conventional lubricating fluid such as oil is typically used to lubricate such pump shaft bearings. The lubricating fluid is generally housed in a bearing lubrication chamber surrounding the pump shaft. When pumping such dangerous fluid materials, it is important that neither the lubricating fluid (e.g. oil) nor the fluid being pumped escape into the atmosphere or adjacent pump areas. Thus, seals must be provided adjacent the lubrication area(s).

Conventional pumps typically include ball bearings for supporting the pump shaft, the bearings being disposed within a misting or lubrication chamber. In the prior art, these shaft supporting ball bearings are typically lubricated by positioning the oil level within the lubrication chamber at a level or position about halfway up the bottom bearing ball. Maintaining the lubricating oil level at a position halfway up the bottom bearing ball necessarily means that when the shaft and supporting bearings are rotated, the balls must continuously plow through the lubricating oil in which they are partially submerged. This results in undesirable heat generation within the bearings and adjacent the pump shaft, this heat generation being caused by the friction created by the bearing balls continually passing through the lubricating oil. Such heat generation increases maintenance requirements and reduces the operating life of the bearings.

Furthermore, when the oil level within the pump lubrication chamber is disposed halfway up the bearing balls or higher as is conventional in the art, dirt or other contaminants present within the oil (or other lubricating fluid) are permitted to make their way into the annular bearing raceways in which the bearing balls are housed. The raceways are sandwiched between the inner and outer bearing frames. Because the bearing balls circumferentially rotate or roll around the pump shaft via these raceways, the presence of such contaminants therein causes increased wear of the bearings and thus additional maintenance.

Accordingly, it would satisfy a long-felt need in the art if a pump were to be developed so as to include an oil misting or lubrication chamber wherein the lubricating fluid (e.g. oil) level was continually disposed below the bearing balls so as to reduce heat generation within the bearings and the lubrication chamber and to limit the amount of dirt or other contaminants permitted to make their way into the bearing raceways.

Commonly owned U.S. Pat. No. 5,261,676, which is prior art to the instant invention due to an offer of sale more than one year before the instant filing date, discloses a centrifugal environmentally sealed pump including a bearing lubrication chamber. Disposed within the lubrication chamber is an oil dispenser affixed to the pump shaft for rotation therewith. The rotating dispenser of this patent has a plurality of rigid hoods which protrude therefrom, these hoods acting to pick up and disperse (i.e. splash and/or mist) the lubricating oil throughout the chamber so as to lubricate the pump shaft bearings therein. The hoods affixed to the rotating dispenser protrude so as to dip below the lubricating oil level within the chamber as the dispenser is rotated thereby scooping the oil from the reservoir area and dispersing it throughout the lubricating chamber and toward the adjacent bearings.

While the bearing lubrication system of U.S. Pat. No. 5,261,676 is excellent and provides good results, the hoods of the dispenser are required to plow through the lubricating oil within the lubrication chamber in order to properly disperse the oil throughout the chamber. Such plowing of the hoods generates undesirable heat within the lubrication chamber and requires the bearings to run at an increased temperature thereby resulting in increased maintenance requirements. Additionally, as a result of the hoods of the '676 dispenser picking up the lubricating oil and subsequently delivering it throughout the chamber, dirt and other contaminants such as rust, carbonized particles, etc. are sometimes directed toward the bearings along with the picked up lubricating oil, this also increasing maintenance requirements.

This application is related to commonly owned U.S. Ser. No. 08/246,150, filed on May 19, 1994 entitled "PUMP OIL MISTER", the disclosure of which is hereby incorporated herein by reference. While the oil misting assembly of 08/246,150 is excellent and provides superb lubrication of the adjacent pump bearings, the design of the rotating dispenser affixed to the pump shaft within the lubrication chamber causes a significant amount of windage adjacent the lubricating fluid surface or level when the pump shaft is rotated at extremely high speeds (e.g. greater than about 3,600 rpm). When such windage is present adjacent the oil level disposed in the reservoir portion of the lubrication chamber, a wake or the like is formed and the lubricating fluid level at the edges of the reservoir adjacent the pump shaft bearings is caused to rise. If the windage (or the operating speed of the pump) is severe enough (e.g. at extremely high speeds) adjacent the oil level, the wake is large enough so that the lubricating fluid level rises to a position adjacent the lower bearing ball(s) thus resulting in the bearing balls of at least one bearing plowing through the lubricating fluid or oil. As discussed above, it is undesirable for the bearing balls to be submerged within the lubricating fluid at the lower end of the lubrication chamber due to the resulting heat generation.

It is apparent from the above that there exists a need in the art for a pump including a bearing lubrication system wherein: 1) the lubricating fluid level is maintained at a level below the bearing balls disposed in the chamber so as to reduce heat generation caused by the bearing balls plowing through and being submerged within the lubricating fluid; 2) the rotating dispenser or disc affixed to the pump shaft within the lubrication chamber produces minimal or reduced windage adjacent the lubricating fluid when operated at high speeds (high rpms) thus allowing the fluid level to be maintained at a substantially constant level throughout the chamber; and 3) clean, cool, and effective lubricating fluid is maintained along the exterior or outer sides of the bearing assemblies between the bearing frame seals and adjacent bearing balls so as to extend the life of the bearings.

It is the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a lubrication system for a pump, the system comprising:

- a lubricating fluid dispenser including a disc-shaped portion affixed to a pump shaft for rotation therewith, the dispenser being disposed within a bearing lubrication chamber housing lubricating fluid;
- a plurality of curved wire members loosely connected to the disc-shaped portion of the dispenser around the outer periphery thereof, the plurality of wire members for dipping into the lubricating fluid when the dispenser is rotated along with the pump shaft and thereby dispensing the lubricating fluid throughout the lubrication chamber and toward shaft supporting bearings; and
- wherein rotation of the dispenser and the pump shaft creates a centrifugal force which causes the plurality of wire members to extend radially away from the center of the pump shaft.

This invention further fulfills the above-described needs in the art by providing a pump comprising:

- a motor;
- a pump shaft having first and second ends, the first end affixed to the motor and the second end affixed to a fluid pumping impeller;
- first and second coaxially aligned pump shaft bearing assemblies surrounding and rotatably supporting the pump shaft, the first and second bearing assemblies being spaced apart from one another along the pump shaft;
- a lubrication chamber disposed along the pump shaft adjacent and between the first and second pump shaft bearing assemblies, the lubrication chamber housing lubricating fluid for lubricating the first and second bearing assembly;
- a lubricating fluid dispenser affixed to the pump shaft for rotation therewith, the dispenser including a plurality of lubricating fluid dispensing attachments affixed along its outer circumferential periphery, the dispensing attachments for dipping into the lubricating fluid as the dispenser is rotated along with the pump shaft so as to disperse or splash the lubricating fluid throughout the chamber and toward the bearing assemblies; and
- wherein each of the attachments includes a first curved wire portion for picking up and dispersing or splashing the lubricating fluid throughout the chamber.

This invention will now be described with respect to certain embodiments thereof, accompanied by certain illustrations, wherein:

DETAILED DESCRIPTION OF CERTAIN EMBODIMENTS OF THIS INVENTION

Referring now more particularly to the accompanying drawings in which like reference numerals indicate like parts throughout the several views.

Figure 1:
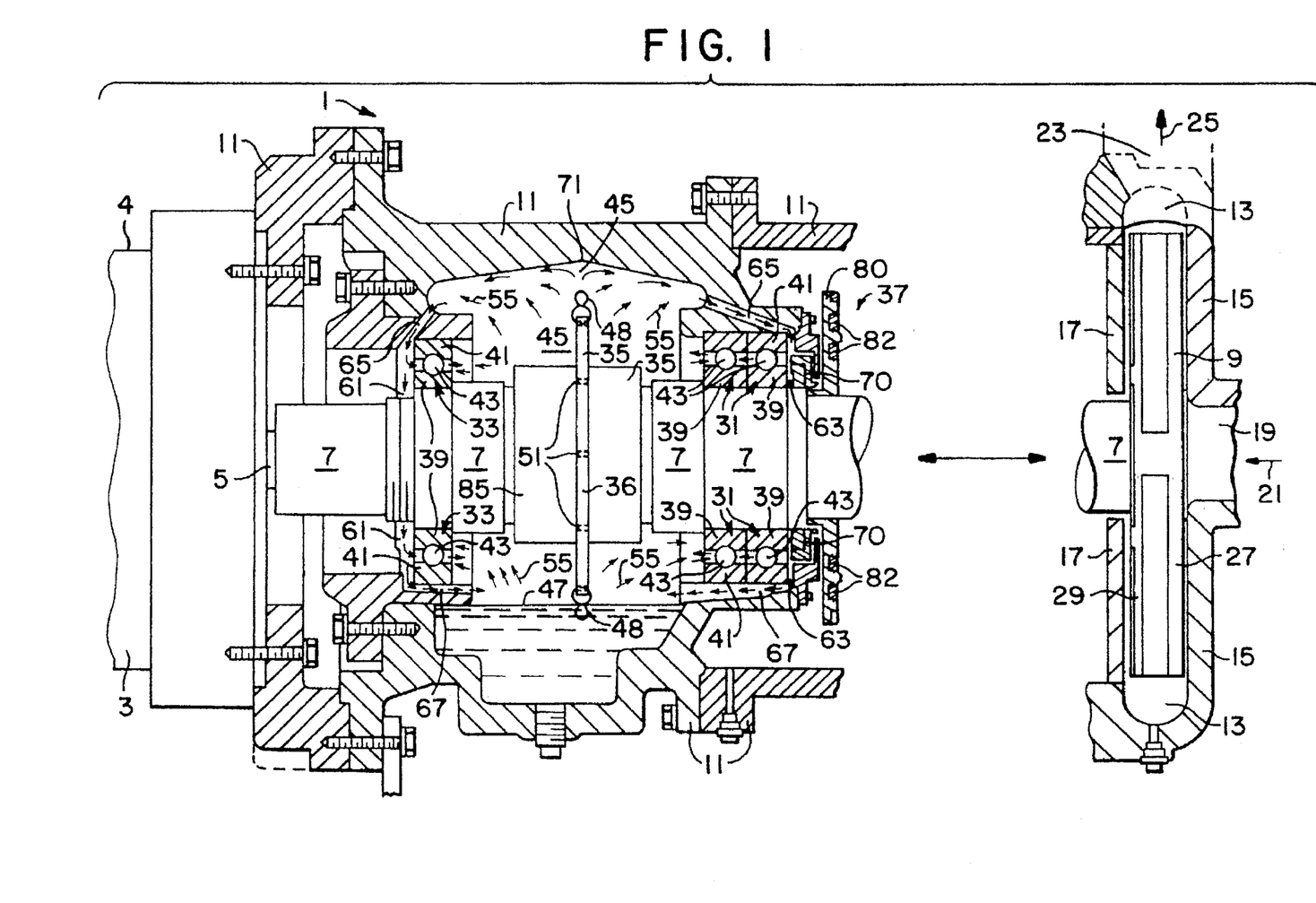
FIG. 1 is a side elevational longitudinal partial cross-sectional view of a centrifugal environmentally sealed pump including a shaft bearing lubrication system according to an embodiment of this invention, the pump being shown cross-sectionally except for the shaft, dispenser, motor, and impeller which are illustrated in a side elevational nature.

FIG. 1 is a side elevational partial cross-sectional view of a centrifugal environmentally sealed pump including a shaft bearing lubrication system according to the first embodiment of this invention. The pump and lubrication system according to this embodiment are illustrated in FIG. 1 cross-sectionally except for pump motor 3, pump shaft 7, impeller 9, and dispenser 35 which are shown in a side elevational nature. Pump 1 is a hermetically sealed pump preferably used for pumping hazardous fluids such as acids, oils, and the like, but, of course, may also be used for pumping conventional non-hazardous materials.

Pump 1 includes electric motor 3 hermetically sealed within metallic motor housing 4. Motor 3 includes drive shaft 5 coupled at one longitudinal end to pump shaft 7. Pump shaft 7 is affixed at one end to fluid pumping impeller 9 and at the other end to motor drive shaft 5. Alternatively, drive shaft 5 may act as the pump shaft and be connected to impeller 9.

In certain embodiments of this invention, an inert gas (e.g. nitrogen) may be introduced into motor housing 4 so as to hermetically seal motor 3 within housing 4 thereby prohibiting the entrance of foreign materials or contaminants thereunto. Housing 4 is, of course, sealingly affixed to pump housing 11.

Impeller 9 of pump 1 is disposed within volute 13 formed by metal casing portion 15 and radially extending backplate 17. Volute 13 defines the centrifugal pumping chamber of pump 1, this pumping chamber including axially extending opening 19 defining fluid inlet or in-flow path 21, and radially extending opening 23 forming fluid outlet or out-flow path 25. As the fluid to be pumped flows into volute 13 by way of fluid inlet opening 19, disc-shaped rotating impeller 9 forces a substantial portion of the fluid to be pumped radially outward through opening 23 and out-flow path 25 thereby pumping the fluid to be pumped.

Impeller 9, of the conventional closed type as shown, is co-axially affixed to the front end of pump shaft 7 for rotation therewith. Impeller 9 includes a pair of integrally formed circular facing plates 27 and 29. A plurality of curved vanes (not shown) interconnecting plates 27 and 29 allow impeller 9 to pump the fluid within volute 13 from inlet opening 19 toward fluid outlet opening 23. Alternatively, a conventional open type impeller may be used.

Rear plate 29 of impeller 9 is threadedly attached to the front end of pump shaft 7 so as to rotate therewith when powered by motor 3. The structural and functional details of impeller 9 and volute 13 are more thoroughly discussed in commonly owned U.S. Pat. No. 5,261,676 and commonly owned co-pending U.S. Ser. No. 08/200,012, filed Feb. 22, 1994, the disclosures of which are hereby incorporated herein by reference.

Referring now to FIGS. 1–5, conventional annular bearing assemblies 31 and 33 rotatingly support pump shaft 7 as driven by motor 3. Bearing assembly 31 is disposed between lubricating fluid dispenser 35 and impeller 9 and is of the double row type in certain embodiments meaning that two separate annular bearing structures are disposed adjacent one another. Bearing assembly 33 is disposed between dispenser 35 and motor 3, assembly 33 being of the single row bearing type in certain embodiments of this invention.

Figure 2:
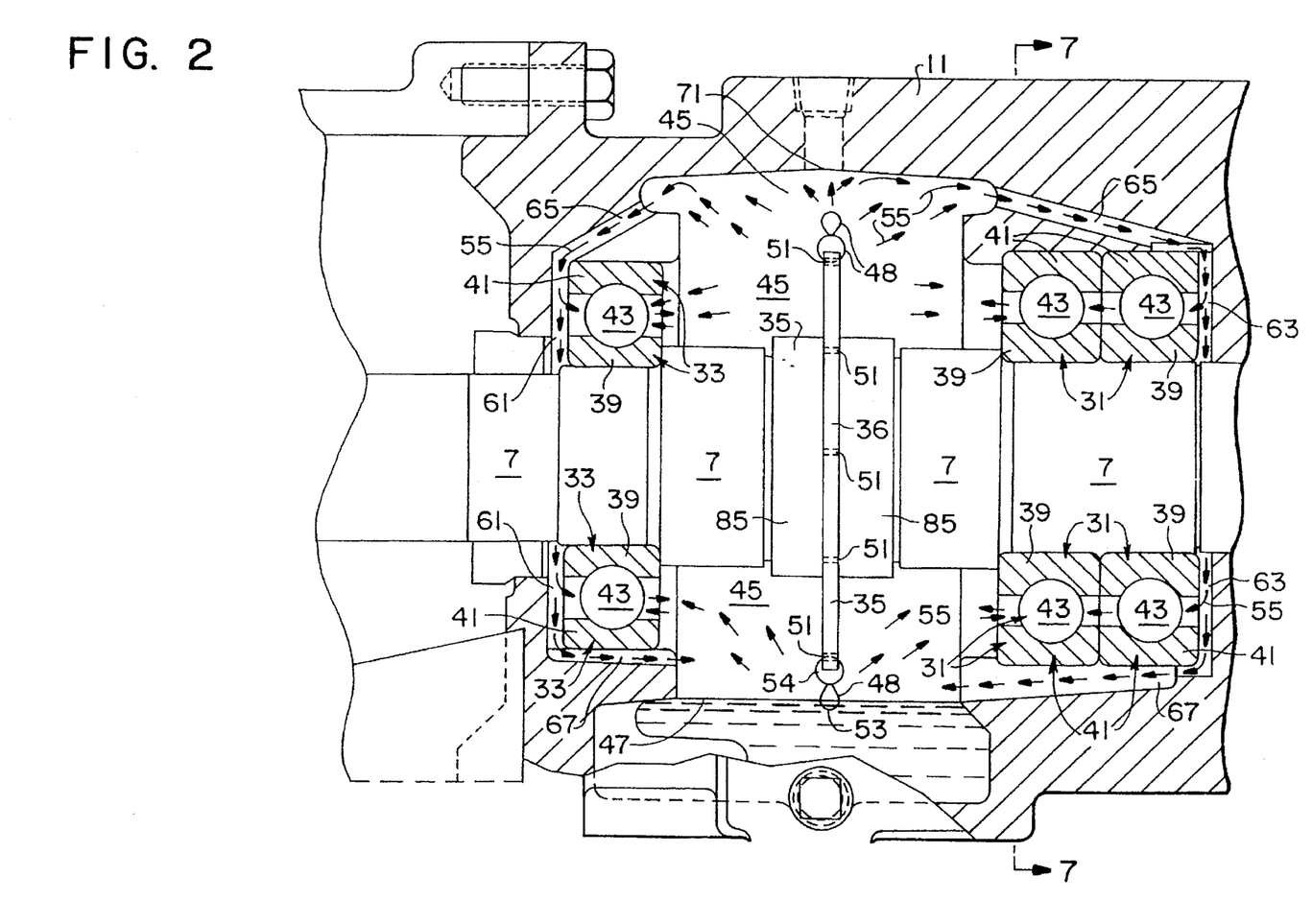
FIG. 2 is an enlarged side elevational longitudinal partial cross-sectional view of the pump including the shaft bearing lubrication system of the FIG. 1 embodiment of this invention, the pump being shown cross-sectionally except for the shaft and dispenser which are illustrated in a side elevational nature.
Figure 3:
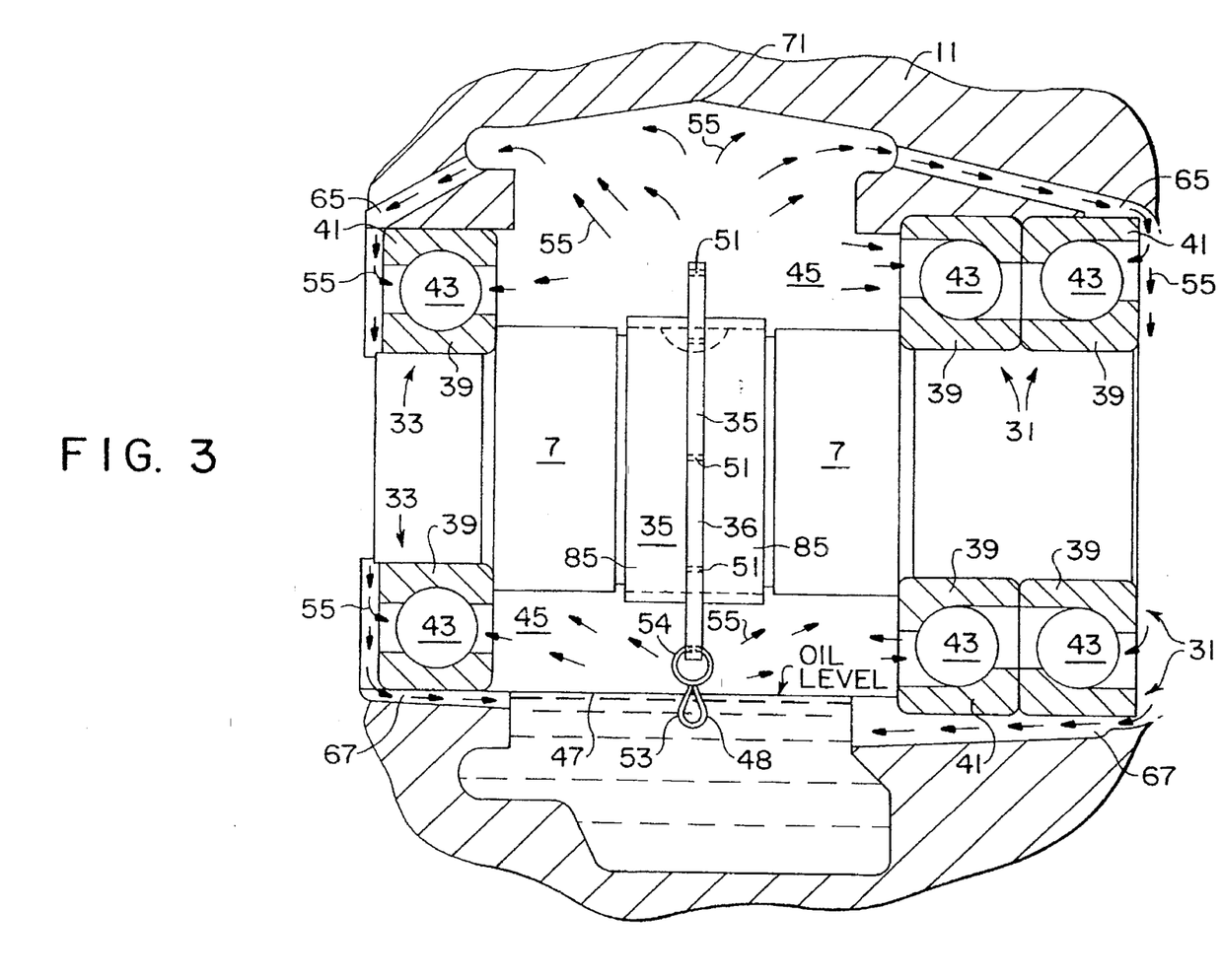
FIG. 3 is an enlarged side elevational partial cross-sectional view of a pump including the shaft bearing lubrication system of another embodiment of this invention, the pump being shown cross-sectionally except for the pump shaft and dispenser which are illustrated in a side elevational nature.

Double row annular bearing assembly 31, as will be recognized by those of skill in the art, provides more support to pump shaft 7 than does single row bearing assembly 33. Accordingly, double row assembly 31 is disposed closest to sealing assembly 37 (including sealing members 82) so as to reduce vibration occurring adjacent seals 82 of this assembly. By reducing vibration within sealing assembly 37, the seals thereof are more effective and experience less leakage.

Alternatively, either double or single row bearing assemblies may be used in the positions occupied by assemblies 31 and 33 as shown in FIGS. 1–3.

Bearing assemblies 31 and 33 are conventional in nature in that they include an annular rotating bearing frame portion 39 affixed to pump shaft 7 for rotation therewith. Additionally, each bearing assembly 31 and 33 includes a fixed annular bearing frame portion 41 which is stationary and mounted to pump housing 11. Bearing balls 43 of bearing assemblies 31 and 33 are disposed within annular bearing raceways, the raceways being defined between annular portions 39 and 41 and circumferentially surrounding pump shaft 7. The bearing raceway of each assembly 31 and 33 is defined by the outer annular periphery of bearing frame portion 39 and the inner annular periphery of stationary bearing frame portion 41.

Bearing assembly 31 as shown in FIGS. 1–2 has a larger inner diameter than does assembly 33 in certain embodiments of this invention because the outer diameter of pump shaft 7 adjacent assemblies 31 and 33 is different. Alternatively, both the inner and outer diameters of bearing assemblies 31 and 33 may be equivalent in certain embodiments.

When motor 3 of pump 1 drives pump shaft 7, annular bearing frame portions 39 rotate along with shaft 7. Due to the rotation of frame portions 39, bearing balls 43 are caused to rotate circumferentially through their respective bearing raceways around pump shaft 7 as the shaft is driven by motor 3 so as to rotatingly support the rotation of shaft 7 against radial movement and vibration.

Bearing assemblies 31 and 33 require constant lubrication. In order to provide lubrication to bearing assemblies 31 and 33, a predetermined amount of conventional lubricating fluid (e.g. lubricating oil) is disposed within main lubrication chamber 45. The lubricating fluid within main chamber 45 is maintained at a predetermined level 47, level 47 being disposed below bearing balls 43 in certain embodiments of this invention so as to reduce heat generation adjacent the bearing assemblies and within chamber 45.

In certain embodiments, lubricating fluid level 47 is maintained within main lubrication chamber 45 at a point below bearing balls 43 (i.e. below the inner diameter of frames 41) as shown in FIGS. 1–3. This provision of oil level 47 below the rotating portions (i.e. bearing balls 43 and rotating bearing frame portions 39) of bearing assemblies 31 and 33 reduces the heat generated within the bearings and within chamber 45 because bearing balls 43 and rotating frame portions 39 are not submerged in the lubricating fluid. Such a submergence would require the moving portions of the bearing assemblies to plow through the lubricating fluid as pump shaft 7 rotates, thus resulting in increased heat generation within chamber 45 and adjacent bearing assemblies 31 and 33. Therefore, level 47 is maintained below balls 43 in certain embodiments in order to reduce heat generation.

As will be appreciated by those of skill in the art, the lubrication system will still be effective (although at a higher temperature) if level 47 is maintained at a level substantially halfway up balls 43. However, it is desirable in certain embodiments of this invention to maintain level 47 at a substantially constant height throughout chamber 45, this height being maintained at a position below the moving portions of bearing assemblies 31 and 33. In order to maintain level 47 substantially constant throughout chamber 45, the rotation of dispenser 35 is designed so as to create a reduced amount of windage adjacent level 47 when shaft 7 and dispenser 35 are rotated at high speeds (e.g. greater than about 3,000–3,600 rpm). Dispenser 35 includes both a disc-shaped portion 36 and tubular portion 85. The thin profile or small width of disc-shaped portion 36 of dispenser 35 allows the windage or air flux created adjacent level 47 to be reduced when dispenser 35 is rotated at high speeds compared to the windage generated by certain prior art rotating dispensers.

Main chamber 45 may hold about 1.5 quarts of oil or other conventional lubricating fluid when filled up to about the inner diameter of one of portions 41 (or slightly below) in certain embodiments of this invention. However, as will be appreciated by those of skill in the art, level 47 may be maintained in certain embodiments at any position below bearing balls 43 as long as there is enough lubricating fluid within chamber 45 so that bearing assemblies 31 and 33 are properly lubricated by way of rotation of dispenser 35.

In order to continually lubricate bearing assemblies 31 and 33, disc-shaped annular dispenser 35 is affixed to shaft 7 for rotation therewith. Disc-shaped portion 36 of dispenser 35 includes a plurality of fluid dispersing or splashing attachments 48 connected thereto around the outer periphery of disc-shaped portion 36. Attachments 48 are loosely connected along the outer periphery of dispenser 35 by way of a plurality of mounting apertures 51 defined in disc-shaped portion 36.

In certain embodiments of this invention, eight such apertures 51 are provided in disc-shaped portion 36 as shown in FIGS. 1–5. Each such aperture 51 allows a separate attachment 48 to be mounted on dispenser 35. While FIGS.

1–3 illustrate only one or two attachments 48 connected to dispenser 35, each aperture 51 may be provided with its own attachments 48. Thus, the number of attachments 48 which may be mounted on dispenser 35 is a function of the number of apertures 51 defined around the outer periphery of disc-shaped portion 36 of dispenser 35.

As shaft 7 and dispenser 35 rotate within chamber 45 when powered by motor 3, attachments 48 loosely connected along the outer periphery of dispenser 35 dip below lubricating fluid level 47 so as to dispense or disperse the lubricating fluid throughout main chamber 45. As dispenser 35 rotates within chamber 45, the submergence of attachments 48 into the lubricating fluid causes attachments 48 in effect to pick up certain amounts of lubricating fluid (the amount picked up depends upon the design of attachments 48) and subsequently fling, splash, throw, or mist the lubricating fluid throughout the confines of chamber 45 when attachments 48 emerge from beneath level 47.

In such a way, the lubricating fluid is misted or thrown throughout chamber 45 thus resulting in bearing assemblies 31 and 33 being continually lubricated as shaft 7 and dispenser 35 rotate as powered by motor 3.

Fluid dispersing or splashing attachments 48 are made of music wire or the like in certain embodiments of this invention so as to prevent wear and bending of the attachments through continued use within chamber 45. The music wire used in making attachments 48 is of the hard steel wire type in certain embodiments of this invention. The wire is shaped into predetermined forms in developing attachments 48, three such exemplary forms of attachments 48 being shown in a side elevational nature in FIGS. 6(a)–6(c).

Attachments 48 each include a pair of ring-shaped portions in certain embodiments of this invention (see FIGS. 1–3, 6(a) and 6(c)). When attachments 48 include such a pair of ring-shaped wire portions, one such portion extends through a corresponding aperture 51 in dispenser 35 so as to loosely connect the attachment 48 along the outer periphery of disc-shaped portion 36 of dispenser 35 in a linkage-like manner. This loose or linkage-like connection of attachments 48 to the disc-shaped portion of dispenser 35 allows substantially the entire body of each attachment 48 to be pressed against the outer periphery of disc-shaped portion 36 during installment thereby reducing the diameter of the dispenser. Accordingly, the ability to reduce the overall diameter of dispenser 35 by positioning attachments 48 in a non-extended position laying substantially flat against the outer periphery of disc-shaped portion 36 allows pump shaft 7 and dispenser 35 to be more easily inserted into pump housing 11 through the outer bearing frames during the manufacturing and assembly of pump 1.

While the inner ring portion 54 of each attachment 48 is fed through a corresponding aperture 51 to connect the attachment to dispenser 35 in certain embodiments, the other (or outer) ring portion 53 of each attachment 48 is designed so as to facilitate the "picking up" of lubricating fluid and flinging or throwing it throughout chamber 45 (and toward the adjacent bearing assemblies) when and after attachment 48 is submerged within the lubricating fluid during rotation of dispenser 35.

Figure 6A:
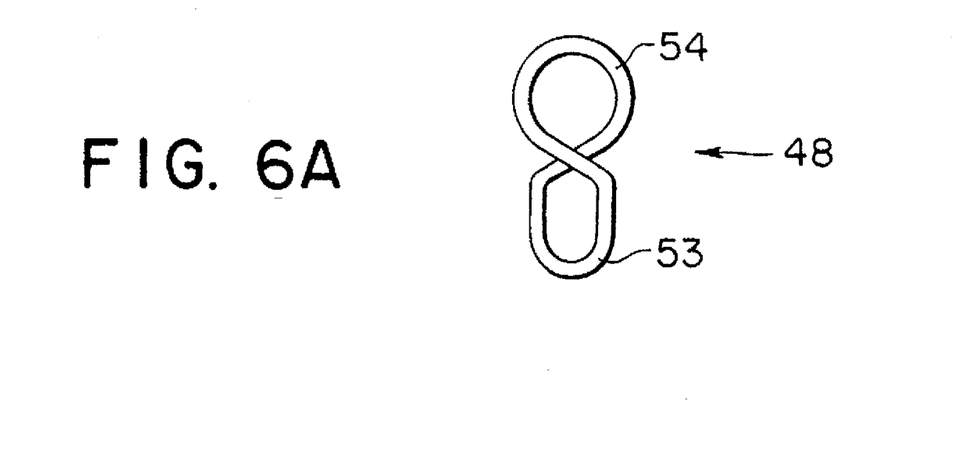
FIGS. 6(a), 6(b), and 6(c) are side elevational views illustrating different embodiments of the wire attachments affixed to the dispenser of the aforesaid embodiments of this invention.
Figure 6B:
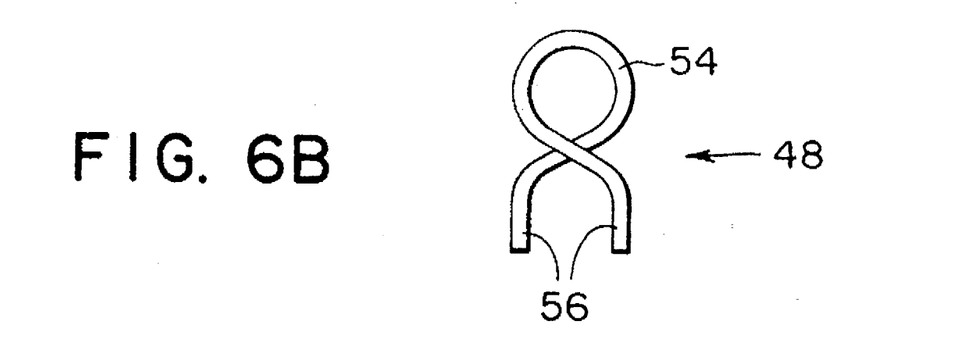
Figure 6C:
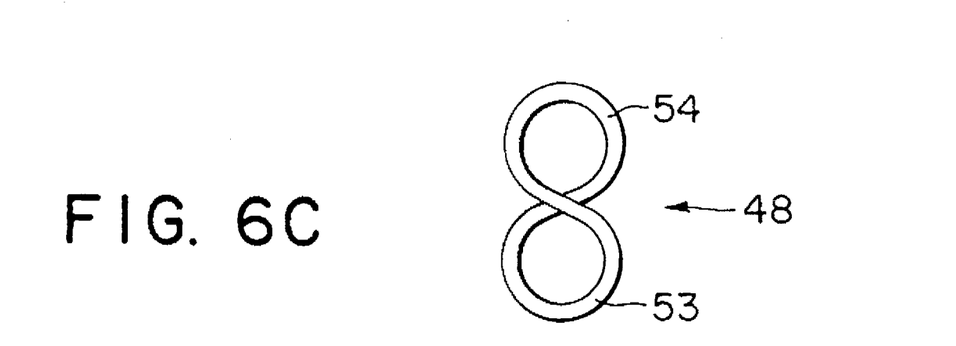

The ring-shaped design of portion 53 (see FIGS. 6(a) and 6(c)) allows each attachment 48 to pick up or retain a significant amount of lubricating fluid each time the attachment is submerged into and emerges from the fluid in the reservoir area of chamber 45. Accordingly, the more lubricating fluid or oil which is picked up or retained by attachments 48 each time a particular attachment is submerged into and emerges from the lubricating fluid, the more fluid that is misted or thrown throughout chamber 45. The more lubricating fluid dispersed throughout chamber 45, the better the lubrication of bearing assemblies 31 and 33.

Alternatively, each attachment 48 need not have a pair of ring portions 53 and 54 in certain embodiments. For example, attachment 48 as shown in the FIG. 6(b) embodiment has a first ring portion 54 for attachment via an aperture 51 to dispenser 35 and a wishbone type design including a pair of legs 56 for picking up and dispersing lubricating fluid throughout chamber 45. Alternatively, each attachment 48 may simply be made up of a single ring-shaped or oval-shaped portion which is both fed through an aperture 51 in dispenser 35 and is designed so as to pick up and fling lubricating fluid throughout chamber 45. Such a single ring-type attachment 48 may, of course, also be made of steel music wire. Additionally, portions 53 and 54 may be rectangular or triangular in certain embodiments.

While up to eight separate attachments 48 may be loosely connected to the outer periphery of disc-shaped portion 36 of dispenser 35 in certain embodiments of this invention, the number of attachments 48 may vary in accordance with the design of the attachments and the amount of oil which is needed for circulation throughout chamber 45. Thus, anywhere from about one to twenty separate attachments 48 may be provided. Additionally, while each attachment 48 is loosely connected to dispenser 35 in a linkage-like fashion in certain embodiments of this invention so as to facilitate installation of the dispenser within chamber 45, attachments 48 may be fixedly connected along the outer periphery of portion 36 of dispenser 35 or integrally formed therewith in certain other embodiments.

Directional arrows 55 in FIGS. 1–3 illustrate the directions of dispersement and flow of the lubricating fluid throughout main chamber 45 and beyond as caused by the rotation of dispenser 35 and attachments 48.

As a result of the substantially symmetrical design of dispenser 35 and attachments 48, the lubricating fluid is kicked up or misted in substantially equal amounts toward both bearing assemblies 31 and 33, respectively within chamber 45. As can be seen by directional arrows 55, the misting or dispersement of lubricating fluid created by attachments 48 directs a substantially continual stream of lubricating fluid or oil toward bearing balls 43 of both assemblies 31 and 33 as shaft 7 is rotated. Alternatively, dispenser 35 and attachments 48 may be designed so as to direct more oil toward one side of chamber 45 than the other.

While the lubricating fluid disposed within main lubrication chamber 45 is directed toward and lubricates the inner or interior sides (the sides facing dispenser 35 and chamber 45) of bearing assemblies 33 and 31, auxiliary lubrication chambers 61 and 63 are provided adjacent the outer or exterior sides (the sides facing away from chamber 45) of bearing assemblies 33 and 31, respectively. As shown, the interior or inner sides of assemblies 31 and 33 face dispenser 35 and main chamber 45, while the outer or exterior sides of assemblies 31 and 33 face impeller 9 and motor 3, respectively.

Lubricating fluid disposed in auxiliary lubrication chambers 61 and 63 lubricates the outer sides of bearing assemblies 33 and 31, respectively, as shown in FIGS. 1–3 by arrows 55. Accordingly, as a result of the provision of main lubrication chamber 45 along with auxiliary lubrication chambers 61 and 63, both the inner and outer sides of bearing assemblies 31 and 33 are simultaneously lubricated by the lubricating fluid originating in main chamber 45 and being partially dispersed therefrom into chambers 61 and 63.

Each auxiliary chamber 61 and 63 is provided with both a circulatory passageway 65 for permitting the lubricating fluid in main chamber 45 to flow into the appropriate auxiliary chamber 61 or 63, and a return passageway 67 for permitting the fluid within each auxiliary chamber 61 and 63 to be recirculated back into main chamber 45. Circulatory passageways 65 and return passageways 67 corresponding to each auxiliary chamber 61 and 63 interface their particular auxiliary chamber with main lubrication chamber 45 thus defining lubricating fluid flow passageways therebetween.

Pump housing 11 adjacent main lubrication chamber 45 is formed so as to taper upwardly from passageways 65 to define apex 71. The tapered design of the interior surface of housing 11 within chamber 45 to apex 71 allows the lubricating fluid which is directed upwardly towards the top of chamber 45 via dispenser 35 and attachments 48 to be directed via the tapered portions of housing 11 toward circulatory passageways 65. After reaching passageways 65, the lubricating fluid flows downward through conduits 65 and into auxiliary chambers 61 and 63 adjacent the exterior sides of bearing assemblies 33 and 31, respectively.

Figure 7:
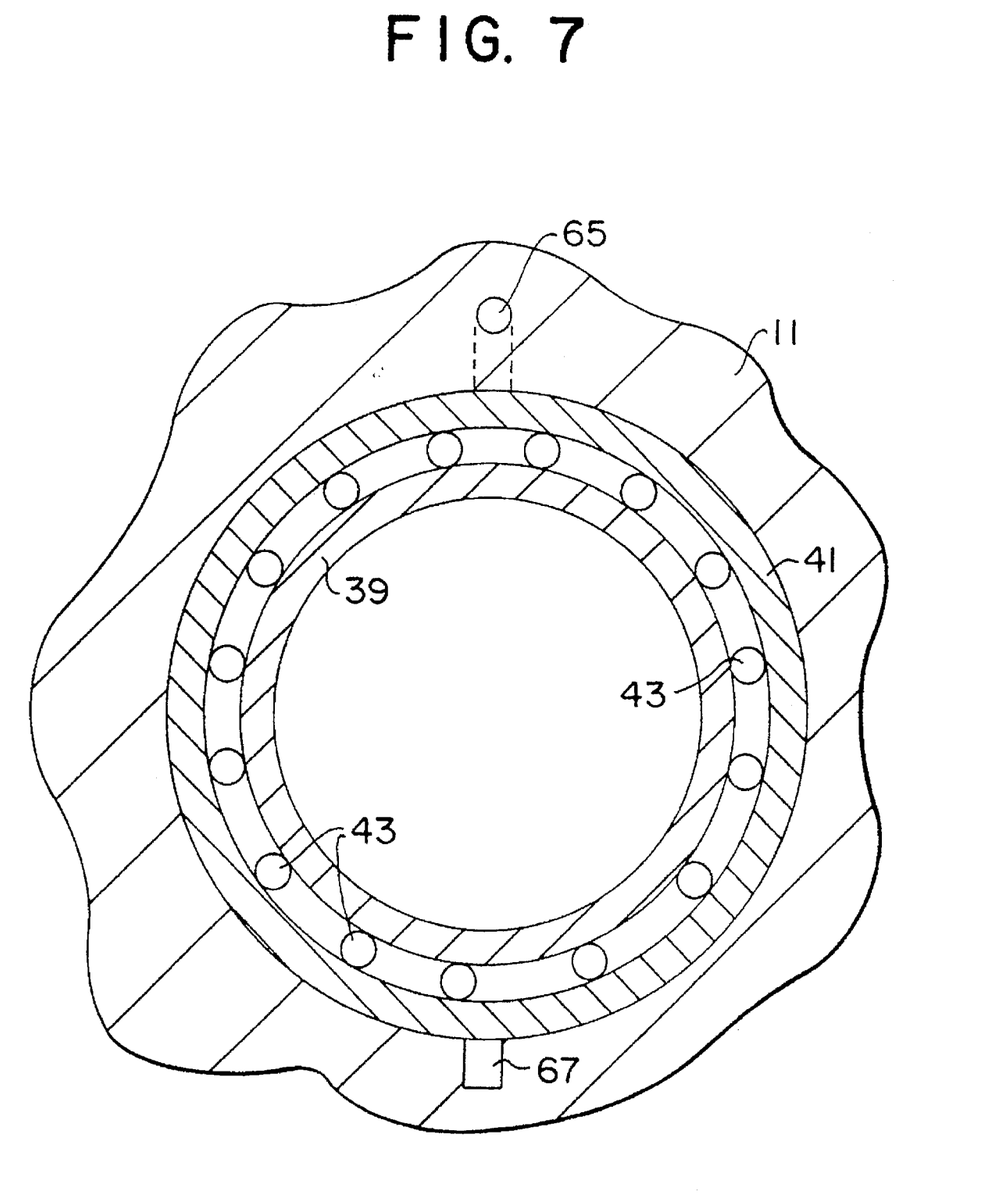
FIG. 7 is a cross-sectional rear view of the front bearing assembly taken cross-sectionally from the point shown in FIG. 2.

The lubricating fluid disposed within auxiliary chambers 61 and 63 is recirculated back into main chamber 45 by way of return passageways 67 disposed below fixedly mounted bearing frame portions 41 of bearing assemblies 33 and 31, return passageways 67 being notches defined between frame portions 41 and housing 11 in certain embodiments as shown in FIG. 7.

In certain embodiments of this invention, circulatory passageways 65 connect the upper end of main chamber 45 with auxiliary chambers 61 and 63 such that the chamber 45 ends of passageways 65 are disposed substantially above the auxiliary chamber ends of passageways 65 so as to allow the lubricating fluid from chamber 45 to flow downward from the top of chamber 45 toward auxiliary chamber 61 and 63 due to the force of gravity.

Additionally, circulatory or auxiliary chamber entrance passageways 65 are connected to auxiliary chambers 61 and 63 at the top or upper ends thereof with respect to gravity in certain embodiments while return passageways 67 interface the lower ends of chambers 61 and 63 with main chamber 45. Thus, the lubricating fluid entering auxiliary chambers 61 and 63 via passageways 65 from main chamber 45 is allowed to flow downward through chambers 61 and 63 and back into main chamber 45 by way of passageways 67 as a result of gravity. Alternatively, in certain other embodiments the circulatory and return passageways need not be arranged in such a manner in that the lubricating fluid may be circulated to and from the auxiliary chambers by way of a pump (not shown).

As a result of the recirculation aspect of the lubricating system of this FIG. 1 embodiment, the lubricating fluid within chambers 61 and 63 which continually lubricates the outer sides of bearing assemblies 31 and 33 is continually recirculated to and from main chamber 45 thereby maintaining clean, cool, and effective lubricating fluid within the auxiliary chambers. Thus, both the inner and outer sides of bearing assemblies 31 and 33 are simultaneously lubricated by way of lubricating fluid disposed within chambers 45, 61, and 63.

While much of the lubricating fluid disposed within auxiliary chambers 61 and 63 makes its way back into main chamber 45 via passageways 67, some of the lubricating fluid (or oil) within the auxiliary chambers makes its way around bearing balls 43 disposed between frame portions 39 and 41 and thereafter back into main chamber 45.

Additionally, as will be recognized by those of skill in the art, some of the lubricating fluid directed at the inner sides of bearing assemblies 31 and 33 from main chamber 45 inevitably makes it way around bearing balls 43 and into the auxiliary chambers. Thus, a continual and improved lubrication of bearing assemblies 31 and 33 including bearing balls 43 is achieved as a result of this lubrication system.

While lubricating fluid level 47 within main chamber 45 is shown in FIGS. 1 and 2 as being maintained at a level adjacent the lower end of return passageway 67 adjacent double row bearing assembly 31, oil level 47 in certain embodiments of this invention may be maintained at a level up to and including one positioned about halfway up any of bearing balls 43 of either bearing assembly 31 or 33. Such levels provide satisfactory bearing lubrication.

In certain embodiments, dispenser 35 is disposed on shaft 7 entirely above level 47 of the lubricating fluid so as to permit only attachments 48 to plow through and be submerged and emerge from within the lubricating fluid. The maintaining of dispenser 35 above the lubricating fluid level allows for a lesser amount of heat to be generated within chamber 45 than would be the case if dispenser 35 along with attachments 48 were to both plow through the lubricating fluid as shaft 7 was rotated.

By maintaining oil level 47 below bearing balls 43 and the other moving parts of bearing assemblies 31 and 33, the amount of dirt and other contaminates permitted to flow into the bearing raceways adjacent bearing balls 43 is reduced thus prolonging the working life of bearing assemblies 31 and 33 and pump 1.

Referring now to FIG. 1, auxiliary chambers 61 and 63 are disposed between the outer sides of bearing assemblies 33 and 31 respectively and clearance seals 70. While clearance seal 70 is shown only adjacent auxiliary chamber 63 a similar clearance seal is positioned adjacent chamber 61, this seal being disposed between motor 3 and chamber 61. Clearance seals 70 act to seal the lubricating fluid within auxiliary chambers 61 and 63 thus preventing leakage. Clearance seal 70 are more fully described and discussed in commonly owned copending U.S. Ser. No. 08/214,320, filed Mar. 17, 1994, the disclosure of which is hereby incorporated herein by reference.

Further shown in FIG. 1 is sealing flange 80 affixed to pump shaft 7 between impeller 9 and bearing clearance seal assembly 70. Sealing flange 80 rotates along with pump shaft 7 when driven by motor 3 such that annular sealing members 82 affixed to flange 80 create a sealing interface with stationary seals (not shown) disposed immediately adjacent thereto. The structural details and functional description of the seal construction including flange 80 and sealing members 82 is more thoroughly discussed and described in commonly owned U.S. Ser. No. 08/200,012, filed Feb. 22, 1994, the disclosure of which is hereby incorporated herein by reference.

In a typical operation of a lubrication system of certain embodiments of this invention, main lubrication chamber 45 is filled with conventional lubricating fluid (e.g. oil) up to about a level corresponding to level 47 shown in FIGS. 1–2. Thereafter, when pump 1 is switched into its operating state by the operator, motor 3 drives motor shaft 5 which in turn drives pump shaft 7. Dispenser 35 affixed to pump shaft 7 rotates therewith within chamber 45 as do rotating bearing frame portions 39 which are also fixedly attached to pump shaft 7.

Annular bearing frame portions 41 surrounding shaft 7 are fixedly mounted to pump housing 11 and remain substantially stationary thus allowing bearing balls 43 to move circumferentially around pump shaft 7 via their corresponding annular raceways defined between annular frame portions 39 and 41. This conventional functionality and bearing assemblies 31 and 33 allows pump shaft 7 to be rotatingly supported against radial movement and vibration.

As dispenser 35 and attachments 48 loosely affixed thereto rotate along with pump shaft 7, attachments 48 are continually caused to be submerged in and emerge from the lubricating fluid (e.g. oil) disposed in the bottom of main chamber 45. When emerging from within the lubricating fluid, each attachment 48 retains a predetermined amount of lubricating fluid and mists or flings such fluid throughout chamber 45 as dispenser 35 and attachments 48 continue to rotate at either slow, moderate, or high speeds within chamber 45.

Due to the substantially symmetrical design of dispenser 35 and attachments 48, the lubricating fluid is directed in substantially equal amounts towards bearing assemblies 31 and 33. Alternatively, attachments 48 may be designed such that more lubricating fluid is directed toward one side of chamber 45 than the other. Thus, the inner or interior sides of bearing assemblies 31 and 33 are continually hit with the lubricating fluid which makes its way between frame portions 39 and 41 and into the annular raceways housing bearing balls 43. In such a manner, the inner sides of bearing assemblies 31 and 33 are continually lubricated while pump 1 is in its operating state.

The oil directed by dispenser 35 and attachments 48 toward the upper side of chamber 45 hits the interior surface of housing 11 which is tapered upwardly towards apex 71. The tapered surface allows the lubricating fluid hitting housing 11 to be directed laterally downward towards passageways 65 and into auxiliary chambers 61 and 63.

Upon reaching auxiliary chambers 61 and 63, the lubricating oil proceeds downward due to gravity, some of the oil proceeding down and around shaft 7 while other portions thereof proceed into the annular gap defined between bearing frame portions 39 and 41. The portion of oil proceeding into this gap lubricates bearing balls 43 within their corresponding raceways, some of this fluid inevitably making its way around balls 43 and back into main chamber 45.

The lubricating fluid may flow back into main chamber 45 by way of return passageway 67 disposed at the lower end of the auxiliary chambers. Thus, both the inner and outer sides of bearing assemblies 31 and 33 are continually lubricated thus prolonging the operating life of the bearing assemblies and the pump.

Figure 4:
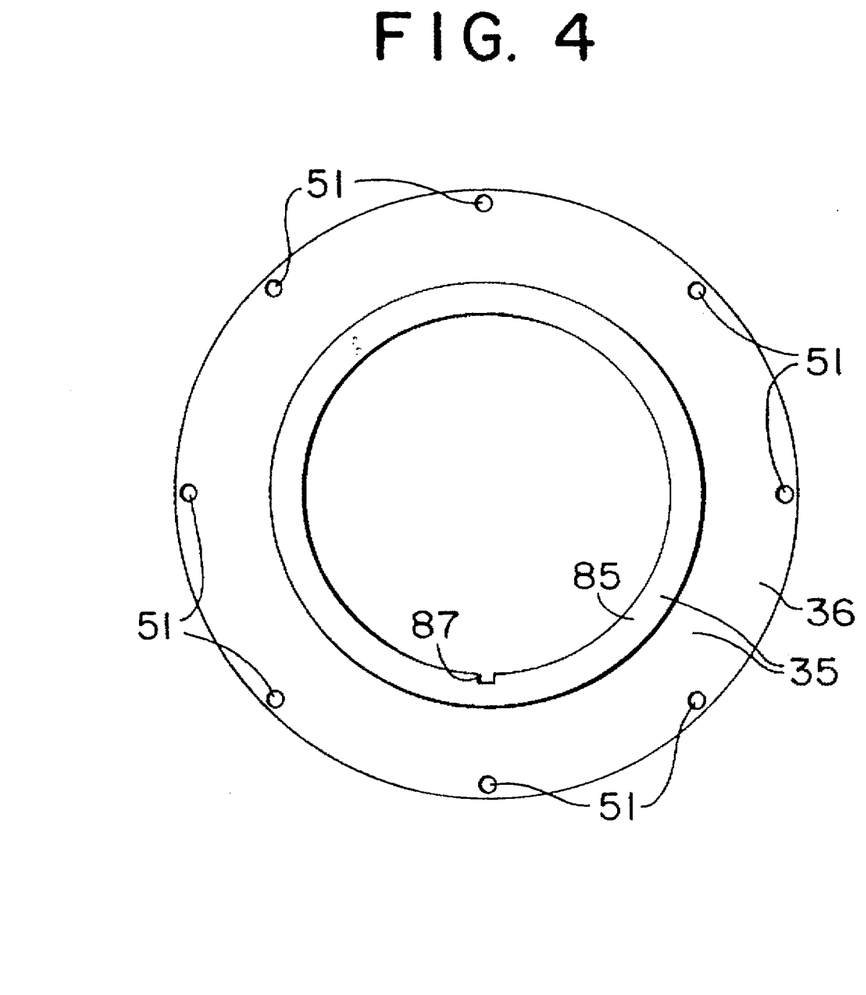
FIG. 4 is a front elevational view of the dispenser of the lubrication system of the aforesaid embodiments of this invention as viewed from either the motor or impeller end of the pump.
Figure 5:
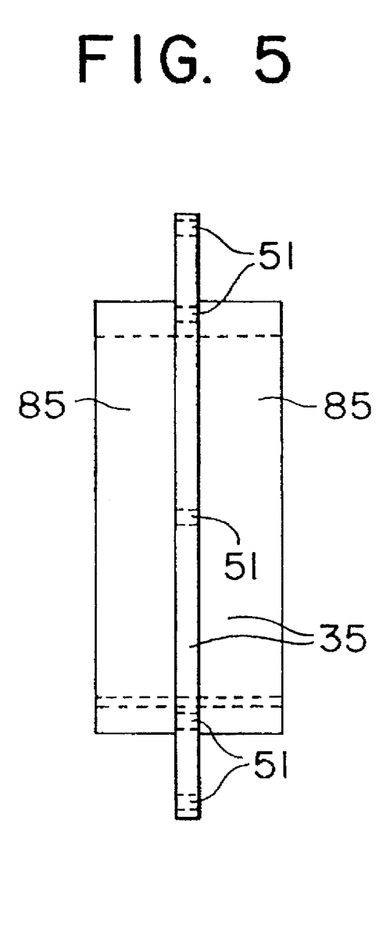
FIG. 5 is a side elevational view of the dispenser of the lubrication system of the aforesaid embodiments of this invention.

FIGS. 4-5 are front and side elevational views of dispenser 35, respectively. As shown, dispenser 35 includes disc-shaped portion 36 through which apertures 51 are defined. Additionally, dispenser 35 includes tubular portion 85 which is utilized in mounting dispenser 35 on shaft 7. Tubular portion 85 includes key-way 87 which by way of a corresponding key (not shown) in shaft 7 allows dispenser 35 to be fixedly mounted on shaft 7 for rotation therewith. Alternatively, dispenser 35 or disc-shaped portion 36 thereof may be integrally formed with shaft 7 in certain embodiments of this invention.

The embodiment shown in FIG. 3 differs from the FIGS. 1-2 embodiment in that level 47 is maintained above passageway 67 and bearing assembly 31 differs ever so slightly in design. Each frame portion 39 and 41 of assembly 31 has a curved step portion defined therein as shown in FIG. 3.

In sum, the lubrication system of the various embodiments of this invention improves upon the performance of two very important functions. Firstly, both sides of bearing assemblies 31 and 33 are continuously lubricated with clean, cool, and effective lubricating fluid due to the circulatory aspect of the system. Secondly, the maintaining of a substantially constant fluid level 47 throughout chamber 45 and keeping this fluid level entirely below rotating portions of the bearing assemblies reduces heat generation within chamber 45 and adjacent bearing assemblies 31 and 33 thereby allowing the bearings to run at lower temperatures and increase the overall life of the bearing assemblies. The end result is a prolonged operating life of pump 1 and reduced maintenance requirements.

The above-described and illustrated elements of the various embodiments of this invention are manufactured and connected to one another by conventional methods commonly used throughout the art unless otherwise specified.

While the different embodiments of the bearing lubrication system of this invention are described above as being used in combination with a hermetically sealed pump, the lubrication systems of this invention may be used with any conventional pump.

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A method of installing a lubricant dispenser into a lubrication chamber of a centrifugal pump, the method comprising the steps of:

providing a pump including a lubrication chamber defined therein, the pump including an opening adjacent the lubrication chamber through which the lubricant dispenser is to be inserted;

providing the lubricant dispenser having a plurality of pivotally or movably mounted dispensing members attached around the outer periphery thereof for the purpose of misting lubricant throughout the lubrication chamber;

collapsing or pivoting downward the dispensing members prior to insertion of the dispenser into the chamber through the opening;

inserting the dispenser with the collapsed or downward pivoted dispensing members through the opening and into the lubrication chamber; and operating the pump so that centrifugal force created by rotation of a pump shaft to which the dispenser is attached causes the dispensing members to extend radially outward from the shaft in order to dispense lubricant throughout the chamber so as to lubricate bearings therein.

2. A motor driven centrifugal pump comprising:

a motor;

a pump shaft having first and second ends, said first end driven by said motor and said second end for driving a fluid pumping impeller;

a first pump shaft bearing assembly surrounding and rotatably supporting the pump shaft;

a second pump shaft bearing assembly surrounding and rotatably supporting the pump shaft;

a lubrication chamber disposed between said first and second bearing assemblies and along said pump shaft for housing lubricating fluid for lubricating said first and second bearing assemblies;

a lubricant dispenser affixed to said shaft for rotation therewith within said lubrication chamber for the purpose of lubricating said bearing assemblies; and wherein said dispenser includes a plurality of pivotally mounted attachments disposed around the periphery thereof for dipping into and dispensing the lubricant throughout said chamber when said shaft is rotated, said attachments being pivotally mounted on said dispenser so that during installation of said dispenser into said chamber the attachments can be pivoted downward so as to reduce the outer diameter of said dispenser thereby facilitating a more efficient and easier installation of the dispenser into said chamber.

* * * * *